United States Patent
Obama

(10) Patent No.: US 9,684,154 B2
(45) Date of Patent: Jun. 20, 2017

(54) ZOOMING OPTICAL SYSTEM, OPTICAL APPARATUS AND METHOD FOR MANUFACTURING ZOOMING OPTICAL SYSTEM

(71) Applicant: Nikon Corporation, Chiyoda-ku, Tokyo (JP)

(72) Inventor: Akihiko Obama, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/469,685

(22) Filed: Aug. 27, 2014

(65) Prior Publication Data

US 2014/0362452 A1    Dec. 11, 2014

Related U.S. Application Data

(63) Continuation of application No. PCT/JP2013/055180, filed on Feb. 27, 2013.

(30) Foreign Application Priority Data

Feb. 29, 2012    (JP) ................. 2012-043840

(51) Int. Cl.
*G02B 9/60*    (2006.01)
*G02B 15/14*    (2006.01)
(Continued)

(52) U.S. Cl.
CPC ............. *G02B 15/14* (2013.01); *G02B 13/18* (2013.01); *G02B 15/173* (2013.01); *G02B 9/60* (2013.01); *Y10T 29/49826* (2015.01)

(58) Field of Classification Search
CPC ........... G02B 9/60; G02B 13/04; G02B 15/14
(Continued)

(56) References Cited

U.S. PATENT DOCUMENTS 4,896,950 A    1/1990    Endo et al.
5,086,356 A    2/1992    Kojima et al.
(Continued)

FOREIGN PATENT DOCUMENTS

JP    63-205628 A    8/1988
JP    01-252915 A    10/1989
(Continued)

OTHER PUBLICATIONS

English translation of International Preliminary Report on Patentability from International Application No. PCT/JP2013/005180, Sep. 12, 2014.
(Continued)

*Primary Examiner* — Thomas K Pham
*Assistant Examiner* — Nicholas R Pasko
(74) *Attorney, Agent, or Firm* — Shapiro, Gabor and Rosenberger, PLLC

(57) ABSTRACT

A compact zooming optical system having high zooming ratio and superb optical performance and a manufacturing method are provided. The zooming optical system includes, in order from an object along the optical axis, a first lens group having positive refractive power, a second lens group having negative refractive power, a third lens group having positive refractive power, a fourth lens group having negative refractive power, and a fifth lens group having negative refractive power. Upon zooming from a wide angle end state to a telephoto end state, respective distances between the first lens group and the second lens group, between the second lens group and the third lens group, between the third lens group and the fourth lens group, and between the fourth lens group and the fifth lens group, are varied.

15 Claims, 11 Drawing Sheets

(51) Int. Cl.
*G02B 15/173* (2006.01)
*G02B 13/18* (2006.01)

(58) Field of Classification Search
USPC .................. 359/682, 746, 753, 763–770
See application file for complete search history.

(56) References Cited

U.S. PATENT DOCUMENTS

| | | | | |
|---|---|---|---|---|
| 5,105,311 | A * | 4/1992 | Tokumaru | G02B 15/173 359/642 |
| 6,061,180 | A * | 5/2000 | Hayakawa | G02B 15/173 359/557 |
| 7,190,520 | B2 * | 3/2007 | Misaka | G02B 27/646 359/554 |
| 7,268,954 | B2 * | 9/2007 | Fujimoto | G02B 15/173 359/676 |
| 7,848,028 | B2 * | 12/2010 | Ohtake | G02B 15/173 359/676 |
| 8,451,549 | B2 * | 5/2013 | Yamanaka | G02B 15/173 359/764 |
| 8,542,449 | B2 * | 9/2013 | Yamanaka | G02B 15/173 359/764 |
| 2011/0286106 | A1 * | 11/2011 | Yamanaka | G02B 15/173 359/684 |
| 2011/0286107 | A1 | 11/2011 | Yamanaka et al. | |
| 2012/0050603 | A1 * | 3/2012 | Imaoka | H04N 5/2254 348/347 |

FOREIGN PATENT DOCUMENTS

| | | |
|---|---|---|
| JP | 10-186234 A | 7/1998 |
| JP | 2002-365547 A | 12/2002 |
| JP | 2006-184430 A | 7/2006 |
| JP | 2011-247963 A | 12/2011 |

OTHER PUBLICATIONS

Office Action issued Nov. 4, 2015, in Chinese Patent Application No. 2013 8001 1477.3.

* cited by examiner

ZOOMING OPTICAL SYSTEM, OPTICAL APPARATUS AND METHOD FOR MANUFACTURING ZOOMING OPTICAL SYSTEM

TECHNICAL FIELD

The present invention relates to a zooming optical system suitable for an interchangeable lens of a camera, a digital camera, a video camera and the like, an optical apparatus and a method for manufacturing the zooming optical system.

BACKGROUND ART

There have been proposed various zooming optical systems to be used for an interchangeable lens or the like of a single lens reflex camera, in which the most object side lens group has positive refractive power. For example, refer to Japanese Patent application Laid-Open Publication No. 2002-365547.

PRIOR ART DOCUMENT

Patent Document

Patent Document 1:
Japanese Patent application Laid-Open Publication No. 2002-365547

SUMMARY OF THE INVENTION

Problem to be Solved by the Invention

However, there has been a problem that a conventional zooming optical system, if compact in size and high zooming ratio are intended to be attained, it is very difficult to attain sufficiently superb optical performance.

The present invention is made in view of the above-described problem, and has an object to provide a compact zooming optical system having high zooming ratio and superb optical performance, an optical apparatus and a method for manufacturing the zooming optical system.

Means for Solving the Problem

According to the present invention, there is provided a zooming optical system comprising, in order from an object side along the optical axis: a first lens group having positive refractive power; a second lens group having negative refractive power; a third lens group having positive refractive power; a fourth lens group having negative refractive power; and a fifth lens group having negative refractive power;

upon zooming from a wide angle end state to a telephoto end state a distance between said first lens group and said second lens group, a distance between said second lens group and said third lens group, a distance between said third lens group and said fourth lens group and a distance between said fourth lens group and said fifth lens group being respectively varied.

Further, according to the present invention, there is provided an optical apparatus having said zooming optical system.

Furthermore, according to the present invention, there is provided a method for manufacturing a zooming optical system comprising steps of disposing, in order from an object side along the optical axis: a first lens group having positive refractive power, a second lens group having negative refractive power, a third lens group having positive refractive power, a fourth lens group having negative refractive power, and a fifth lens group having negative refractive power; and constructing such that, upon zooming from a wide angle end state to a telephoto end state, a distance between said first lens group and said second lens group, a distance between said second lens group and said third lens group, a distance between said third lens group and said fourth lens group and a distance between said fourth lens group and said fifth lens group may be respectively varied.

Effect of the Invention

According to the present invention, there can be provided a compact zooming optical system that has high zooming ratio and superb optical performance, an optical apparatus, and a method for manufacturing the zooming optical system.

EMBODIMENTS FOR CARRYING OUT THE INVENTION

Figure 1:
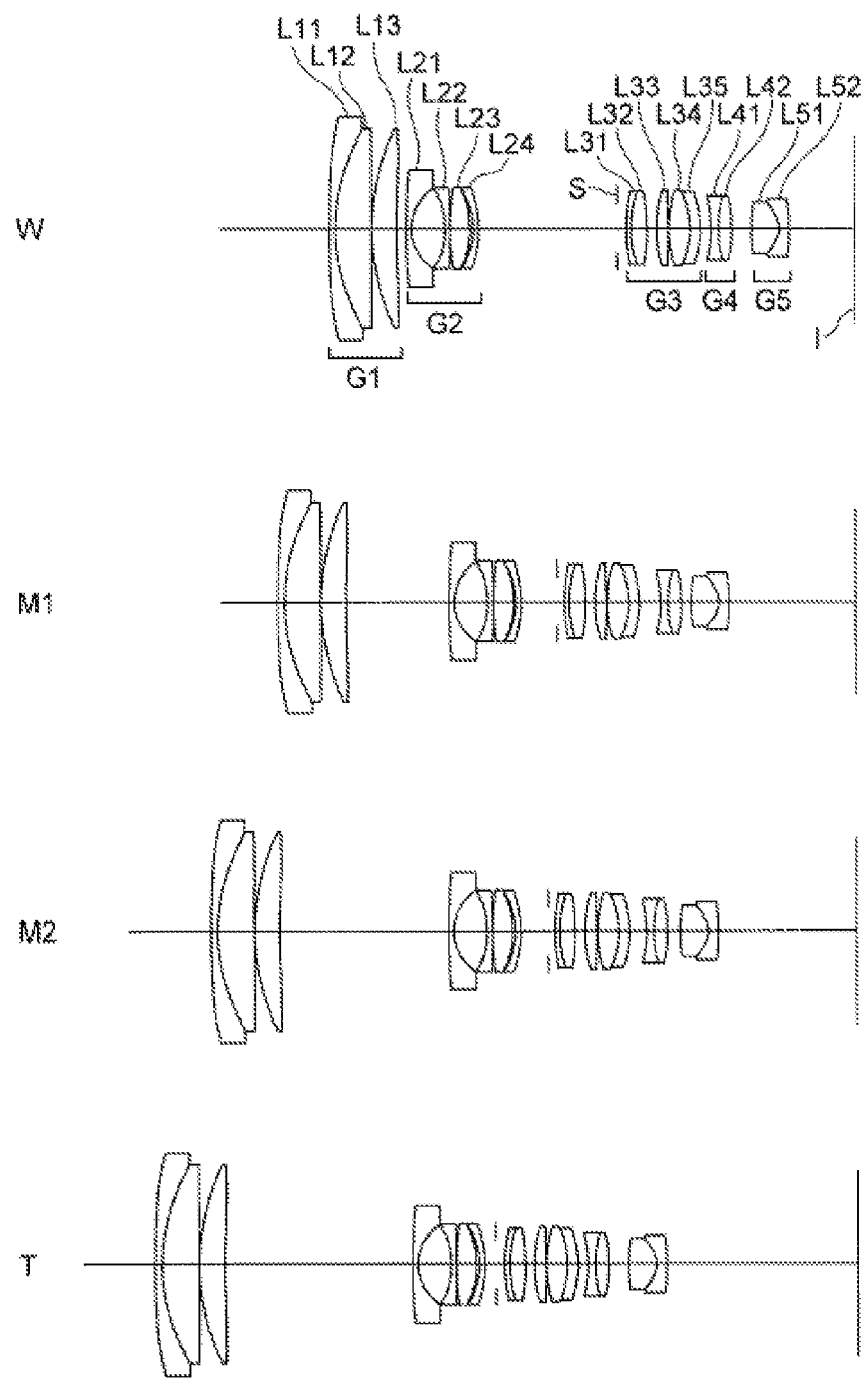
FIG. 1 shows sectional views in a wide-angle end state, in a first intermediate focal length state, in a second intermediate focal length state and in a telephoto end state, of a zooming optical system according to a first Example of the present application.

A zooming optical system of the present application, an optical apparatus and a method for manufacturing the zooming optical system are explained below.

A zooming optical system of the present application comprises, in order from an object side along the optical axis, a first lens group having positive refractive power, a second lens group having negative refractive power, a third lens group having positive refractive power, a fourth lens group having negative refractive power, and a fifth lens group having negative refractive power, and upon zooming from a wide angle end state to a telephoto end state a distance between said first lens group and said second lens group, a distance between said second lens group and said third lens group, a distance between said third lens group and said fourth lens group, and a distance between said fourth lens group and said fifth lens group being respectively varied.

By the above configuration, the zooming optical system of the present application is enabled to effect zooming and it is possible to suppress variation in distortion caused by the zooming.

Further, the zooming optical system of the present application has the fifth lens group that is a negative lens group as described above, thereby it being possible to dispose the principal point of the zooming optical system at the object side and reduce the entire length of the zooming optical system in the whole zooming range from the wide angle end state to the telephoto end state. In addition thereto, distance to a marginal light flux from the optical axis can be made small, so the fifth lens group may be made small in diameter. Assuming that the fifth lens group is a positive lens group, if the entire length of the zooming optical system as well as diameter of the fifth lens group is same, refractive power of each lens group would be larger in comparison with a case where the fifth lens group is a negative lens group. Therefore, in such assumed case, it is difficult to suppress variation in spherical aberration as well as variation in astigmatism upon zooming from the wide angle end state to the telephoto end state.

For the above reasons, according to the present invention, it is possible to realize a compact zooming optical system having high zooming ratio and superb optical performance.

It is preferable that the zooming optical system of the present application satisfies the following conditional expression (1):

$$1.80<(-f5)/fw \quad (1)$$

where f5 denotes a focal length of the fifth lens group and fw denotes a focal length of the zooming optical system in the wide angle end state.

Conditional expression (1) defines a range of optimum focusing distance of the fifth lens group and a condition for suppressing variations in aberrations caused by zooming while securing zooming ratio. By satisfying the conditional expression (1), the zooming optical system of the present application can suppress variation in distortion as well as variation in astigmatism caused by zooming and can realize superb optical performance.

If the value of (−f5)/fw of the conditional expression (1) of the present application is equal to or falls below the lower limit, the focal length of the fifth lens group becomes too small. For this reason, it becomes impossible for the fifth lens group to suppress variation in distortion as well as variation in astigmatism caused by zooming, thereby superb optical performance being not attained.

Incidentally, in order to attain the effect of the present application surely, it is preferable to set the lower limit value of the conditional expression (1) to 2.40.

It is more preferable to set the upper limit value of the conditional expression (1) to 10.0. If the value of (−f5)/fw of the conditional expression (1) of the zooming optical system of the present application is equal to or falls below this upper limit value of the conditional expression (1), it is possible for the fifth lens group to suppress variation in distortion as well as variation in astigmatism caused by zooming, thereby superb optical performance being able to be attained. Incidentally, in order to attain the effect of the present application more surely, it is preferable to set the upper limit value of the conditional expression (1) to 8.50.

Further, it is preferable that the zooming optical system of the present application satisfies the following conditional expression (2):

$$0.40<f5/f4<4.20 \quad (2)$$

where f4 denotes a focal length of the fourth lens group and f5 denotes a focal length of the fifth lens group.

Conditional expression (2) defines an optimum ratio of the focal length of the fifth lens group to the focal length of the fourth lens group, and is a condition for suppressing variations in aberrations caused by zooming. By satisfying the conditional expression (2), it is possible to suppress variation in distortion as well as variation in astigmatism caused by zooming, thereby superb optical performance being able to be attained.

If the value of f5/f4 of the conditional expression (2) of the zooming optical system of the present application is equal to or falls below the lower limit of the conditional expression (2), the focal length of the fifth lens group becomes too small relative to the focal length of the fourth lens group. For this reason, it becomes impossible to suppress variation in distortion as well as variation in astigmatism caused by zooming, so that superb optical performance can not be attained.

Incidentally, in order to attain the effect of the present application more surely, it is preferable to set the lower limit value of the conditional expression (2) to 0.52. Moreover, in order to attain the effect of the present application more surely, it is more preferable to set the lower limit value of the conditional expression (2) to 0.66.

On the other hand, if the value of f5/f4 of the conditional expression (2) of the zooming optical system of the present application is equal to or exceeds the upper limit value of the conditional expression (2), the focal length of the fourth lens group becomes relatively small. This invites that it is impossible to suppress variation in astigmatism generated at the fourth lens group so that superb optical performance can not be realized.

Incidentally, in order to attain the effect of the present application more surely, it is preferable to set the upper limit value of the conditional expression (2) to 2.80. Moreover, in order to attain the effect of the present application more surely, it is more preferable to set the upper limit value of the conditional expression (2) to 1.60.

Furthermore, it is preferable that the zooming optical system of the present application satisfies the following conditional expression (3):

$$0.88<(-f5)/f3<8.20 \quad (3)$$

where f3 denotes a focal length of the third lens group and f5 denotes a focal length of the fifth lens group.

Conditional expression (3) defines an optimum ratio of the focal length of the fifth lens group to the focal length of the third lens group, and is a condition for suppressing variations in aberrations caused by zooming. By satisfying the conditional expression (3), it is possible to suppress respective variations in distortion, astigmatism, spherical aberration and coma caused by zooming, thereby superb optical performance being able to be attained.

If the value of (−f5)/f3 of the conditional expression (3) of the zooming optical system of the present application is equal to or falls below the lower limit value of the conditional expression (3), the focal length of the fifth lens group becomes too small relative to the focal length of the third lens group. For this reason, it becomes impossible to suppress variation in distortion as well as variation in astigmatism caused by zooming, so that superb optical performance can not be attained.

Incidentally, in order to attain the effect of the present application more surely, it preferable to set the lower limit value of the conditional expression (3) to 1.20. Further, in order to attain the effect of the present application more surely, it is more preferable to set the lower limit value of the conditional expression (2) to 1.46.

On the other hand, if the value of (−f5)/f3 of the conditional expression (3) of the zooming optical system of the present application is equal to or exceeds the upper limit value of the conditional expression (3), the focal length of the third lens group becomes relatively small. This invites that it is impossible to suppress variation in spherical aberration as well as variation in coma generated at the third lens group so that superb optical performance cannot be realized.

Incidentally, in order to attain the effect of the present application more surely, it is preferable to set the upper limit value of the conditional expression (3) to 7.50. In order to attain the effect of the present application more surely, it is more preferable to set the upper limit value of the conditional expression (3) to 5.80.

Further, it is preferable that the zooming optical system of the present application satisfies the following conditional expression (4):

$$0.066 < R5/f5 < 0.600 \quad (4)$$

where f5 denotes a focal length of the fifth lens group and R5 denotes curvature radius of a lens surface in the fifth lens group which surface is concave facing the object side and whose curvature radius is smallest in absolute value.

Conditional expression (4) defines a condition for suppressing variations in aberrations of the zooming optical system of the present application. R5 in the conditional expression (4) is a curvature radius of a lens surface which is concave to the object side and whose sign is negative. By satisfying the conditional expression (4), the zooming optical system of the present application can suppress variation in astigmatism and variation in coma caused by zooming, thereby superb optical performance being able to be realized.

If the value of R5/f5 of the conditional expression (4) of the zooming optical system of the present application is equal to or falls below the lower limit of the conditional expression (4), it becomes impossible to suppress variation in astigmatism caused by zooming, so that superb optical performance cannot be attained.

Incidentally, in order to attain the effect of the present application more surely, it is preferable to set the lower limit value of the conditional expression (4) to 0.087. Further, in order to attain the effect of the present application more surely, it is more preferable to set the lower limit value of the conditional expression (4) to 0.098.

On the other hand, if the value of R5/f5 of the conditional expression (4) of the zooming optical system of the present application is equal to or exceeds the upper limit value of the conditional expression (4), it becomes difficult for the fifth lens group to suppress variation in coma as well as variation in astigmatism generated from the third lens group to the fourth lens group so that superb optical performance cannot be realized.

Incidentally, in order to attain the effect of the present application more surely, it is preferable to set the upper limit value of the conditional expression (4) to 0.490. In order to attain the effect of the present application more surely, it is more preferable to set the upper limit value of the conditional expression (4) to 0.350.

In the zooming optical system of the present application, it is preferable that the fifth lens group has a cemented lens and that the lens surface in the fifth lens group which is concave to the object side and whose curvature radius is smallest in absolute value is a cemented surface of the cemented lens. By such a configuration the zooming optical system of the present application can suppress decentering coma aberration from being generated due to manufacturing error of the lens surface, so superb optical performance being realized.

Further, in the zooming optical system of the present application it is preferable that, upon zooming from the wide angle end state to the telephoto end state, a distance between the third lens group and the fourth lens group increases from the wide angle end state to the intermediate focus state and decreases from the intermediate focus state to the telephoto end state. By such a configuration the zooming optical system of the present application can suppress variation in astigmatism generated at the third lens group to the fourth lens group, so that superb optical performance can be realized.

Further, in the zooming optical system of the present application it is preferable that, upon zooming from the wide angle end state to the telephoto end state, a distance between the fourth lens group and the fifth lens group decreases from the wide angle end state to the intermediate focus state and increases from the intermediate focus state to the telephoto end state. By such a configuration the zooming optical system of the present application can suppress variation in astigmatism generated at the fourth lens group to the fifth lens group, so that superb optical performance can be realized.

Further, in the zooming optical system of the present application it is preferable that, upon zooming from the wide angle end state to the telephoto end state, the third lens group and the fifth lens group are moved in a body. By such a configuration the third lens group and the fifth lens group in the zooming optical system of the present application may be simplified in structure and can suppress decentering from each other, so that superb optical performance can be realized.

Further, in the zooming optical system of the present application it is preferable that, upon zooming from the wide angle end state to the telephoto end state, a distance between the first lens group and the second lens group increases and a distance between the second lens group and the third lens group decreases. By such a configuration the zooming optical system of the present application can suppress spherical aberration as well as astigmatism generated at each lens group, so that it becomes possible to suppress variation in spherical aberration as well as variation in astigmatism upon zooming from the wide angle end state to the telephoto end state.

Further, in the zooming optical system of the present application it is preferable that the fifth lens group has an aspheric surface. By such a configuration the zooming optical system of the present application can suppress coma as well as astigmatism generated at the fifth lens group, so that superb optical performance can be realized.

Further, in the zooming optical system of the present application it is preferable that the aspheric surface in the fifth lens group is the most object side surface. By such a configuration the zooming optical system of the present application can suppress coma as well as astigmatism generated at the fifth lens group, so that superb optical performance can be realized.

Further, it is preferable that the zooming optical system of the present application has an aperture stop in or in the neighborhood of the third lens group. By such a configuration the zooming optical system of the present application can suppress off-axis aberration, and in particular variation in astigmatism, upon zooming from the wide angle end state to the telephoto end state.

Further, in the zooming optical system of the present application it is preferable that, upon zooming from the wide angle end state to the telephoto end state, the aperture stop is moved together with the third lens group in a body. By such a configuration the zooming optical system of the present application can suppress off-axis aberration, and in particular variation in astigmatism, upon zooming from the wide angle end state to the telephoto end state.

The optical apparatus of the present application is characterized in being provided with the zooming optical system having the above described configuration, thereby a compact optical apparatus having high zooming ratio and superb optical performances being realized.

A method for manufacturing a zooming optical system according to the present application, is characterized in steps of disposing, in order from an object side along the optical, axis: a first lens group having positive refractive power, a second lens group having negative refractive power, a third lens group having positive refractive power, a fourth lens group having negative refractive power, and a fifth lens group having negative refractive power; and constructing such that, upon zooming from a wide angle end state to a telephoto end state, a distance between said first lens group and said second lens group, a distance between said second lens group and said third lens group, a distance between said third lens group and said fourth lens group and a distance between said fourth lens group and said fifth lens group may be respectively varied. Thus, it is possible to manufacture a compact zooming optical system having high zooming ratio and superb optical performance.

Zooming optical systems relating to the numerical examples of the present application are explained below with reference to accompanying drawings.

First Example

FIG. 1 shows sectional views in a wide-angle end state, in a first intermediate focal length state, in a second intermediate focal length state and in a telephoto end state, of a zooming optical system according to a first Example of the present application. In FIG. 1, W denotes the wide-angle end state; M1 denotes the first intermediate focal length state; M2 denotes the second intermediate focal length state and T denotes the telephoto end state. They are same in cross sectional views of each Example explained hereinafter.

The zooming optical system according to the present Example is composed of, in order from an object side, a first lens group G1 having positive refractive power; a second lens group G2 having negative refractive power; a third lens group G3 having positive refractive power; a fourth lens group G4 having negative refractive power; and a fifth lens group G5 having negative refractive power.

The first lens group G1 is composed of, in order from an object side along the optical axis, a cemented lens composed of a negative meniscus lens L11 having a convex surface facing the object side and a positive meniscus lens L12 having a convex surface facing the object side cemented together, and a positive meniscus lens L13 having a convex surface facing the object side.

The second lens group G2 is composed of, in order from an object side along the optical axis, a negative meniscus lens L21 having a convex surface facing the object side, a negative meniscus lens L22 having a concave surface facing the object side, a biconvex positive lens L23, and a negative meniscus lens L24 having a concave surface facing the object side. The negative meniscus lens L21 is a glass mold type aspherical lens whose aspherical surface is applied on the image plane side lens surface.

The third lens group G3 is composed of, in order from an object side along the optical axis, a cemented lens composed of a negative meniscus lens L31 having a convex surface facing the object side and a biconvex positive lens L32 cemented together, a positive meniscus lens L33 having a convex surface facing the object side, and a cemented lens composed of a biconvex positive lens L34 and a negative meniscus lens L35 having a concave surface facing the object side cemented together. An aperture stop S is provided in the neighborhood of the object side of the third lens group G3.

The fourth lens group G4 is composed of, in order from an object side along the optical axis, only a cemented lens composed of a biconcave negative lens L41 a biconvex positive lens L42 cemented together. The most object side negative lens L41 in the fourth lens group G4 is a glass mold type aspherical lens whose aspherical surface is applied on the object side lens surface.

The fifth lens group G5 is composed of, in order from an object side along the optical axis, only a cemented lens composed of a biconvex positive lens L51 cemented to a negative meniscus lens L52 having a concave surface facing the object side. A lens surface which is concave facing the object side and whose curvature radius is smallest in absolute value, in the fifth lens group G5, is the cemented surface between the positive lens L51 and the negative meniscus lens L52. The positive lens L51 at the most object side in the fifth lens group G5 is a glass mold type aspherical lens whose aspherical surface is applied on the object side lens surface.

In the zooming optical system according to the present Example having configured as above described, upon zooming from the wide angle end state W to the telephoto end state T, the first lens group G1 moves monotonously toward the object side; the second lens group G2 moves to the image side from the wide angle end state W to the first intermediate focal length state M1 and then to the object side from the first intermediate focal length state M1 to the telephoto end state T; the third lens group G3, the fourth lens group G4 and the fifth lens group G5 move monotonously toward the object side. At this time, the aperture stop S, the third lens group G3 and the fifth lens group G5 move together in a body. Thus, upon zooming from the wide angle end state W to the telephoto end state T, a distance between the first lens group G1 and the second lens group G2 increases, a distance between the second lens group G2 and the third lens group decreases, a distance between the third lens group G3 and the fourth lens group G4 increases from the wide angle state W to the first intermediate focal length state M1 and decreases from the first intermediate focal length state M1 to the telephoto end state T, and a distance between the fourth lens group G4 and the fifth lens group G5 decreases from the wide angle end state W to the first intermediate focal length state M1 and increases from the first intermediate focal length state M1 to the telephoto end state T.

Various values associated with the zooming optical system according to the present Example are listed in Table 1.

In Table 1, f denotes a focal length, and Bf denotes a back focal length.

In [Surface Data], m shows the lens surface number counted in order from the object side, r shows a radius of curvature of the lens surface, d shows a distance to the next surface, nd shows refractive index of the material at d-line (wavelength λ=587.6 nm), and vd shows Abbe number of the material at d-line (wavelength λ=587.6 nm). OP shows object plane and I shows image plane.

Meanwhile, ∞ in the column of curvature radius r denotes a plane surface. In the column of refractive index nd, refractive index of the air nd=1.000000 is omitted.

In [Aspherical Data], an aspherical surface shown in [Surface Data] is exhibited by the following expression:

$$x=(h^2/r)/[1+[1-\kappa(h/r)^2]^{1/2}]+A4\times h^4+A6\times h^6+A8\times h^8+A10\times h^{10}$$

where h denotes a vertical height from the optical axis, x denotes a sag amount which is a distance along the optical axis from the tangent surface at the vertex of the aspherical surface to the aspherical surface at the vertical height h from the optical axis, x denotes a conical coefficient, A4, A6, A8 and A10 denote aspherical coefficients, r denotes a paraxial radium of curvature that is a radius of curvature of a reference sphere. "E-n" (n: integer) denotes "×10$^{-n}$", for example, "1.234E-5" denotes "1.234×10$^{-5}$".

In [Various Data], FNO denotes an F-number, ω denotes a half angle of view in degrees, Y denotes an image height, TL denotes a total lens length of the zooming optical system, that is, a distance from the most object side surface of the first lens group G1 upon focusing on infinitely distant object to the image plane I, di (i: integer) denotes a variable face to face distance from the i-th surface, and φ denotes an aperture stop diameter. W denotes a wide-angle end state, M1 denotes a first intermediate focal length state, M2 denotes a second intermediate focal length state, and T denotes a telephoto end state.

In [Lens Group Data], ST denotes a starting surface of each lens group, that is, the most object side lens surface in each lens group.

In [Values for Conditional Expressions], respective values with respect to conditional expressions are shown.

In Table 1 for various values, "mm" is generally used for the unit of length such as the focal length f, the radius of curvature r and others. However, since similar optical performance can be obtained by an optical system proportionally enlarged or reduced its dimension, the unit is not necessarily to be limited to "mm", and any other suitable unit can be used. The explanation of reference symbols in the above is the same in the other Examples, so that duplicated explanations are omitted.

TABLE 1

First Example

[Surface Data]

| m | r | d | nd | vd |
|---|---|---|---|---|
| op | ∞ | | | |
| 1 | 101.7859 | 1.4000 | 1.950000 | 29.37 |
| 2 | 32.5483 | 6.8500 | 1.497820 | 82.52 |
| 3 | 507.0890 | 0.1000 | | |
| 4 | 37.3347 | 4.8500 | 1.882997 | 40.76 |
| 5 | 300.9596 | d5 | | |
| 6 | 78.3556 | 1.0000 | 1.806100 | 40.74 |
| *7 | 8.1498 | 6.1500 | | |
| 8 | −15.0638 | 1.0000 | 1.882997 | 40.76 |
| 9 | −111.9446 | 0.1500 | | |
| 10 | 40.1532 | 3.6000 | 1.808090 | 22.79 |
| 11 | −17.3545 | 0.6000 | | |
| 12 | −13.7038 | 1.0000 | 1.902650 | 35.70 |
| 13 | −22.0248 | d13 | | |
| 14 | ∞ | 1.5000 | | Aperture Stop S |
| 15 | 29.5784 | 1.0000 | 2.000690 | 25.45 |
| 16 | 18.6363 | 2.8000 | 1.516800 | 64.10 |
| 17 | −55.7763 | 2.0000 | | |
| 18 | 24.2391 | 2.1500 | 1.516800 | 64.10 |
| 19 | 858.3278 | 0.1000 | | |
| 20 | 17.6507 | 4.1000 | 1.497820 | 82.52 |
| 21 | −15.2742 | 1.9000 | 1.950000 | 29.37 |
| 22 | −23.3096 | d22 | | |
| *23 | −14.7112 | 1.3500 | 1.806100 | 40.74 |
| 24 | 31.5094 | 2.3000 | 1.808090 | 22.79 |
| 25 | −28.7594 | d25 | | |
| *26 | 32.3594 | 5.3000 | 1.516120 | 63.84 |
| 27 | −5.7380 | 1.9000 | 1.902650 | 35.70 |
| 28 | −44.3875 | Bf | | |
| I | ∞ | | | |

[Aspherical Data]

Surface Number: 7

| κ | 0.8091 |
|---|---|
| A4 | −2.81470E−05 |
| A6 | −5.35060E−07 |
| A8 | 1.15520E−08 |
| A10 | −2.20190E−10 |

Surface Number: 23

| κ | −4.9782 |
|---|---|
| A4 | −5.87340E−05 |
| A6 | 1.19560E−06 |
| A8 | −1.77790E−08 |
| A10 | 9.84750E−11 |

Surface Number: 26

| κ | 20.0000 |
|---|---|
| A4 | −8.22840E−05 |
| A6 | 4.90020E−06 |
| A8 | −8.03990E−08 |
| A10 | 6.79360E−09 |

[Various Data]
Zoom ratio 9.42

| | W | T |
|---|---|---|
| f | 10.30~97.00 | |
| FNO | 4.11~5.87 | |
| ω | 39.54~4.59° | |
| Y | 7.97~7.97 | |
| TL | 100.65~133.98 | |

| | W | M1 | M2 | T |
|---|---|---|---|---|
| f | 10.30000 | 35.00000 | 60.00000 | 97.00000 |
| ω | 39.58845 | 12.47589 | 7.34848 | 4.58728 |
| FNO | 4.10582 | 5.89080 | 5.89975 | 5.86696 |
| φ | 8.80 | 8.80 | 9.20 | 11.60 |
| d5 | 1.80000 | 19.37763 | 32.00000 | 35.69237 |
| d13 | 26.66538 | 7.08688 | 5.31318 | 2.20000 |

TABLE 1-continued

First Example

| d22 | 2.21304 | 4.15113 | 3.20959 | 2.20000 |
|---|---|---|---|---|
| d25 | 3.82473 | 1.88667 | 2.82824 | 3.83771 |
| Bf | 13.04939 | 24.70184 | 26.64686 | 36.95330 |

[Lens Group Data]

| | ST | f |
|---|---|---|
| G1 | 1 | 63.72998 |
| G2 | 6 | −11.45481 |
| G3 | 15 | 14.77721 |
| G4 | 23 | −42.51000 |
| G5 | 26 | −36.37957 |

[Values for Conditional Expressions]

(1) (−f5)/fw = 3.532
(2) f5/f4 = 0.856
(3) (−f5)/f3 = 2.462
(4) R5/f5 = 0.158

Figure 2A:
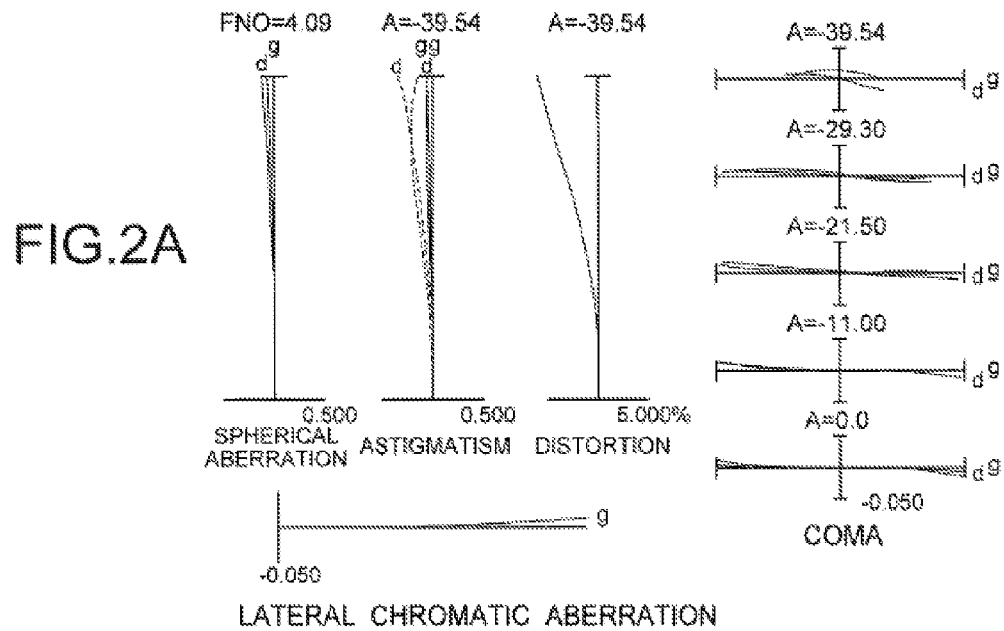
FIGS. 2A and 2B are graphs showing various aberrations in the wide-angle end state and in the first intermediate focal length state, of the zooming optical system according to the first Example upon focusing on infinity.
Figure 2B:
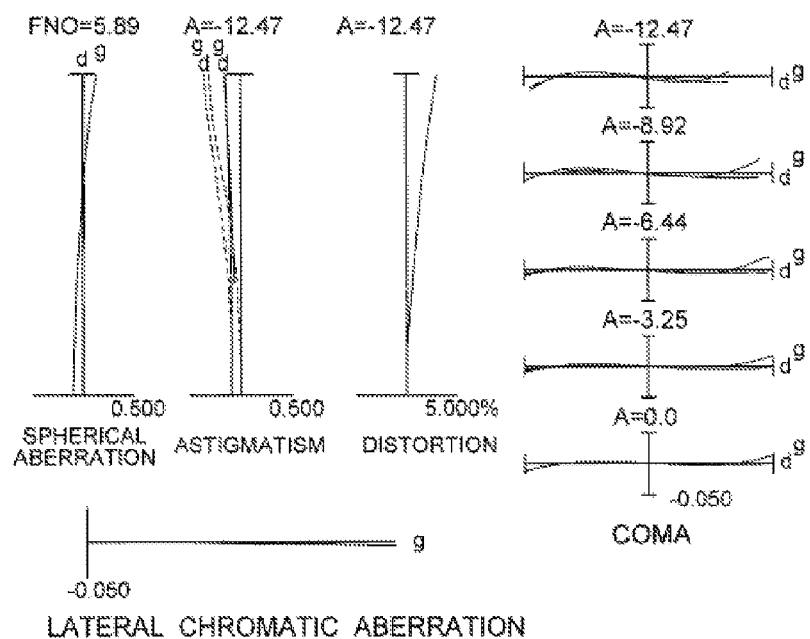

FIGS. 2A and 2B, respectively, are graphs showing various aberrations in the wide-angle end state and in the first intermediate focal length state, of the zooming optical system according to the first Example upon focusing on infinity.

Figure 3A:
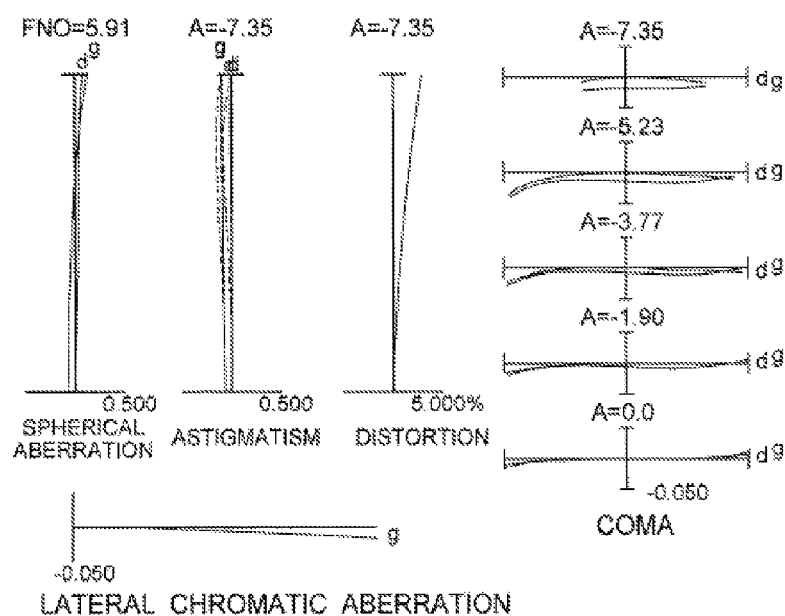
FIGS. 3A and 3B are graphs showing various aberrations in the second intermediate focal length state and in the telephoto end state, of the zooming optical system according to the first Example upon focusing on infinity.
Figure 3B:
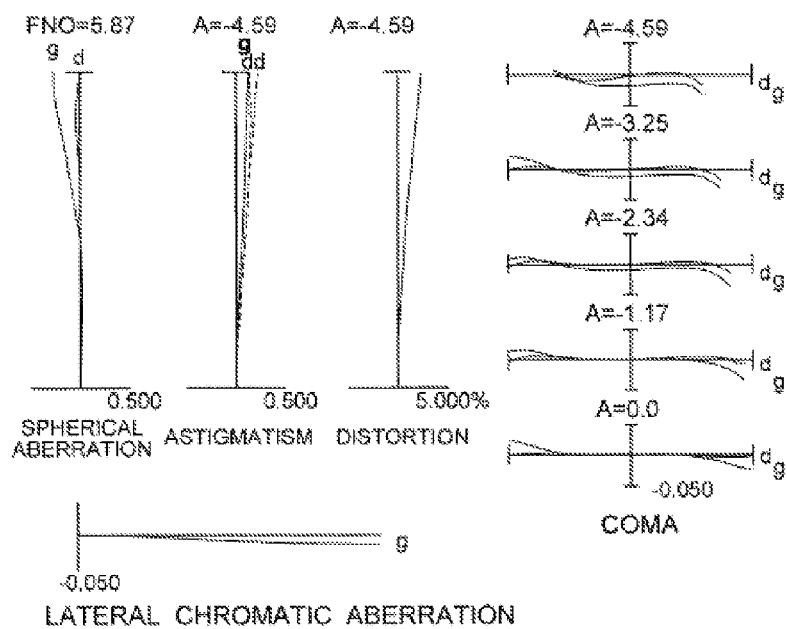

FIGS. 3A and 3B, respectively, are graphs showing various aberrations in the second intermediate focal length state and in the telephoto end state, of the zooming optical system according to the first Example upon focusing on infinity.

In respective graphs, FNO denotes an f-number, and A denote an angle of incidence of light rays (unit in degree). In respective graphs, d denotes an aberration curve at d-line (wavelength λ=587.6 nm), and g denotes an aberration curve at g-line (wavelength λ=435.8 nm). Graphs in which no d nor g occurs, show aberration curves at d-line.

In the graph showing astigmatism, a solid line indicates a sagittal image plane, and a broken line indicates a meridional image plane. The above-described explanation regarding various aberration graphs is the same as the other Examples.

As is apparent from the respective graphs, the zooming optical system according to the present Example shows superb optical performance as a result of good corrections to various aberrations in the range from the wide-angle end state to the telephoto end state.

Second Example

Figure 4:
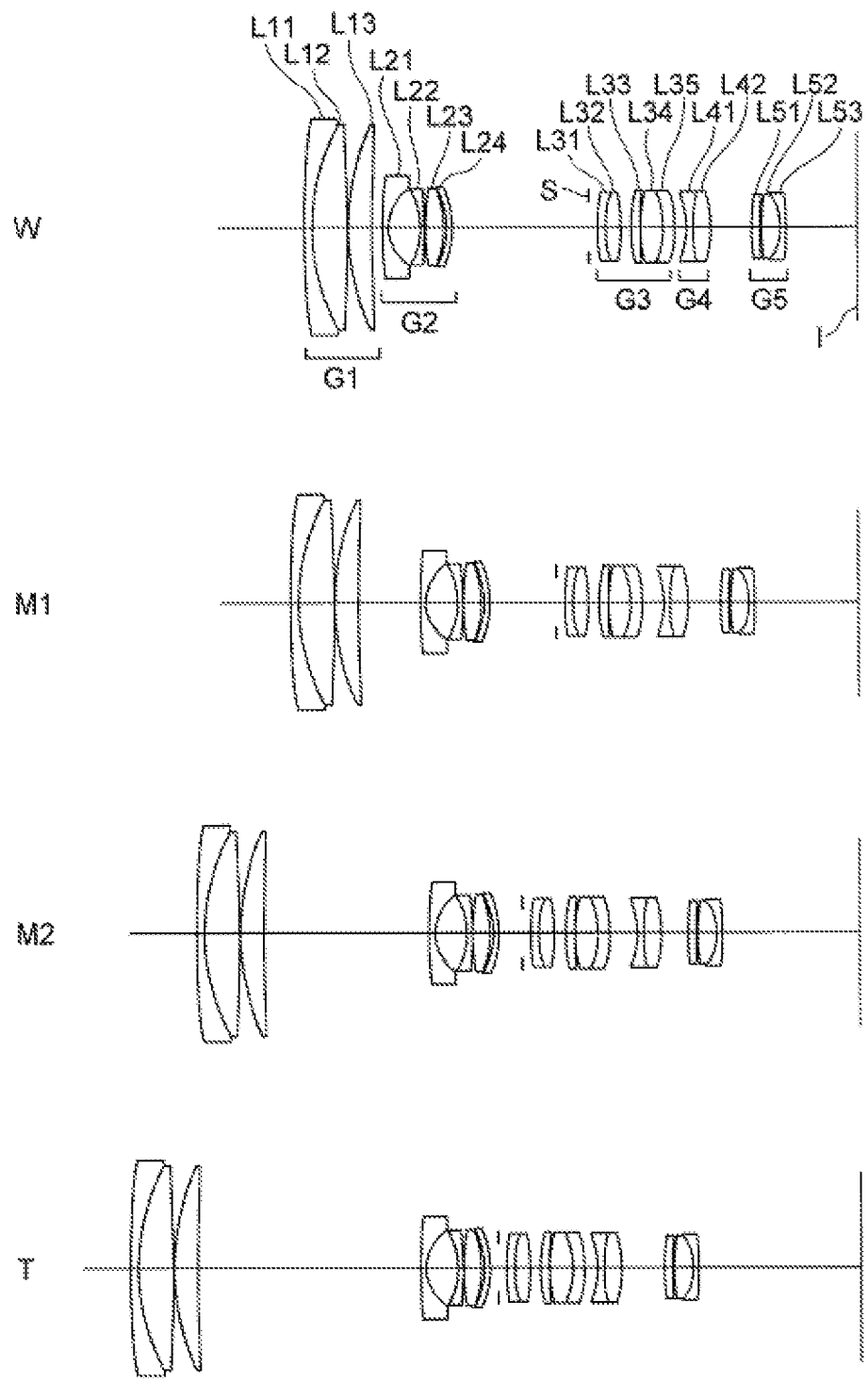
FIG. 4 shows sectional views in a wide-angle end state, in a first intermediate focal length state, in a second intermediate focal length state and in a telephoto end state, of a zooming optical system according to a second Example of the present application.

FIG. 4 shows sectional views in a wide-angle end state, in a first intermediate focal length state, in a second intermediate focal length state and in a telephoto end state, of a zooming optical system according to a second Example of the present application.

The zooming optical system according to the present Example is composed of, in order from an object side along the optical axis, a first lens group G1 having positive refractive power, a second lens group G2 having negative refractive power, a third lens group G3 having positive refractive power, a fourth lens group G4 having negative refractive power, and a fifth lens group G5 having negative refractive power.

The first lens group G1 is composed of, in order from an object side along the optical axis, a cemented lens composed of a negative meniscus lens L11 having a convex surface facing the object side and a biconvex positive lens L12 cemented together, and a positive meniscus lens L13 having a convex surface facing the object side.

The second lens group G2 is composed of, in order from an object side along the optical axis, a negative meniscus lens L21 having a convex surface facing the object side, a negative meniscus lens L22 having a concave surface facing the object side, a biconvex positive lens L23, and a negative meniscus lens L24 having a concave surface facing the object side. The negative meniscus lens L21 is a glass mold type aspherical lens whose aspherical surface is applied on the image plane side lens surface.

The third lens group G3 is composed of, in order from an object side along the optical axis, a cemented lens composed of a negative meniscus lens L31 having a convex surface facing the object side and a biconvex positive lens L32 cemented together, a positive meniscus lens L33 having a convex surface facing the object side, and a cemented lens composed of a biconvex positive lens L34 and a negative meniscus lens L35 having a concave surface facing the object side cemented together. An aperture stop S is provided in the neighborhood of the object side of the third lens group G3.

The fourth lens group G4 is composed of, in order from an object side along the optical axis, only a cemented lens composed of a biconcave negative lens L41 and a biconvex positive lens L42 cemented together. The most object side negative lens L41 in the fourth lens group G4 is a glass mold type aspherical lens whose aspherical surface is applied on the object side lens surface.

The fifth lens group G5 is composed of, in order from an object side along the optical axis, a positive meniscus lens L51 having a convex surface facing the object side, and a cemented lens composed of a biconvex positive lens L52 and a negative meniscus lens L53 having a concave surface facing the object side and cemented together. A lens surface which is concave facing the object side and whose radius of curvature is smallest in absolute value, in the fifth lens group G5, is the cemented surface between the positive lens L52 and the negative meniscus lens L53. The positive lens L51 at the most object side in the fifth lens group G5 is a glass mold type aspherical lens whose aspherical surface is applied on the object side lens surface.

In the zooming optical system according to the present Example having configured as above described, upon zooming from the wide angle end state W to the telephoto end state T, the first lens group G1 moves monotonously toward the object side; the second lens group G2 moves toward the image side from the wide angle end state W to the second intermediate focal length state M2 and then toward the object side from the second intermediate focal length state M2 to the telephoto end state T; the third lens group G3, the fourth lens group G4 and the fifth lens group G5 move monotonously toward the object side. At this time, the aperture stop S, the third lens group G3 and the fifth lens group G5 move together in a body. Thus, upon zooming from the wide angle end state W to the telephoto end state T, a distance between the first lens group G1 and the second lens group G2 increases, a distance between the second lens group G2 and the third lens group G3 decreases, a distance between the third lens group G3 and the fourth lens group G4 increases from the wide angle state W to the second intermediate focal length state M2 and decreases from the second intermediate focal length state M2 to the telephoto end state T, and a distance between the fourth lens group G4 and the fifth lens group G5 decreases from the wide angle end state W to the second intermediate focal length state M2 and increases from the second intermediate focal length state M2 to the telephoto end state T.

Various values associated with the zooming optical system according to the second Example are listed in Table 2.

TABLE 2

Second Example

[Surface Data]

| m | r | d | nd | νd |
|---|---|---|---|---|
| op | ∞ | | | |
| 1 | 149.4765 | 1.4000 | 1.950000 | 29.37 |
| 2 | 38.6411 | 6.6000 | 1.497820 | 82.57 |
| 3 | −351.6316 | 0.1000 | | |
| 4 | 41.7750 | 4.6000 | 1.883000 | 40.66 |
| 5 | 328.2384 | d5 | | |
| 6 | 72.4891 | 1.0000 | 1.806100 | 40.97 |
| *7 | 7.7391 | 5.8500 | | |
| 8 | −13.9505 | 1.0000 | 1.883000 | 40.66 |
| 9 | −103.9877 | 0.1000 | | |
| 10 | 40.8028 | 3.4000 | 1.808090 | 22.74 |
| 11 | −18.8169 | 0.6000 | | |
| 12 | −13.4665 | 1.0000 | 1.883000 | 40.66 |
| 13 | −18.2363 | d13 | | |
| 14 | ∞ | 1.4000 | | Aperture Stop S |
| 15 | 28.0065 | 1.5000 | 2.000690 | 25.46 |
| 16 | 17.4484 | 2.9000 | 1.497820 | 82.57 |
| 17 | −29.2004 | 2.0000 | | |
| 18 | 28.1447 | 1.6000 | 1.795040 | 28.69 |
| 19 | 53.0274 | 0.1000 | | |
| 20 | 27.5255 | 4.2000 | 1.497820 | 82.57 |
| 21 | −13.9702 | 2.1800 | 2.000690 | 25.46 |
| 22 | −20.5898 | d22 | | |
| *23 | −13.2794 | 1.0000 | 1.806100 | 40.97 |
| 24 | 24.2300 | 3.5000 | 1.728250 | 28.38 |
| 25 | −18.1038 | d25 | | |
| *26 | 47.8180 | 1.6500 | 1.583130 | 59.42 |
| 27 | 100.8528 | 0.2000 | | |
| 28 | 38.0626 | 3.8000 | 1.516800 | 63.88 |
| 29 | −8.1478 | 1.0000 | 1.954000 | 33.46 |
| 30 | −52.2418 | Bf | | |
| I | ∞ | | | |

[Aspherical Data]

Surface Number: 7

| κ | 0.9456 |
|---|---|
| A4 | −7.24873E−05 |
| A6 | −1.38772E−06 |
| A8 | 3.49795E−08 |
| A10 | −9.90184E−10 |

Surface Number: 23

| κ | −5.0310 |
|---|---|
| A4 | −2.13400E−04 |
| A6 | 3.25281E−06 |
| A8 | −4.07563E−08 |
| A10 | 2.36604E−10 |

Surface Number: 26

| κ | −15.0179 |
|---|---|
| A4 | 1.31767E−05 |
| A6 | 1.09725E−06 |
| A8 | −1.09512E−08 |
| A10 | 4.81750E−10 |

[Various Data]
Zoom ratio 9.42

| | W | T |
|---|---|---|
| f | 10.30~97.00 | |
| FNO | 4.13~5.79 | |
| ω | 39.34~4.54° | |
| Y | 7.97~7.97 | |
| TL | 104.60~137.98 | |

TABLE 2-continued

Second Example

| | W | M1 | M2 | T |
|---|---|---|---|---|
| f | 10.30000 | 20.00000 | 50.00000 | 97.00000 |
| ω | 39.34094 | 21.01370 | 8.74331 | 4.54414 |
| FNO | 4.12898 | 4.96138 | 5.51068 | 5.79408 |
| φ | 9.00 | 9.00 | 9.50 | 9.80 |
| d5 | 2.00000 | 11.66890 | 30.95696 | 41.68937 |
| d13 | 26.10451 | 13.02302 | 4.99096 | 2.00000 |
| d22 | 2.34607 | 4.05509 | 5.18708 | 2.50149 |
| d25 | 7.92894 | 6.21994 | 5.08793 | 7.77351 |
| Bf | 13.54976 | 19.90197 | 26.27832 | 31.33645 |

[Lens Group Data]

| | ST | f |
|---|---|---|
| G1 | 1 | 66.37666 |
| G2 | 6 | −11.22172 |
| G3 | 15 | 16.67848 |
| G4 | 23 | −58.03866 |
| G5 | 26 | −77.03015 |

[Values for Conditional Expressions]

(1) (−f5)/fw = 7.479
(2) f5/f4 = 1.327
(3) (−f5)/f3 = 4.619
(4) R5/f5 = 0.106

Figure 5A:
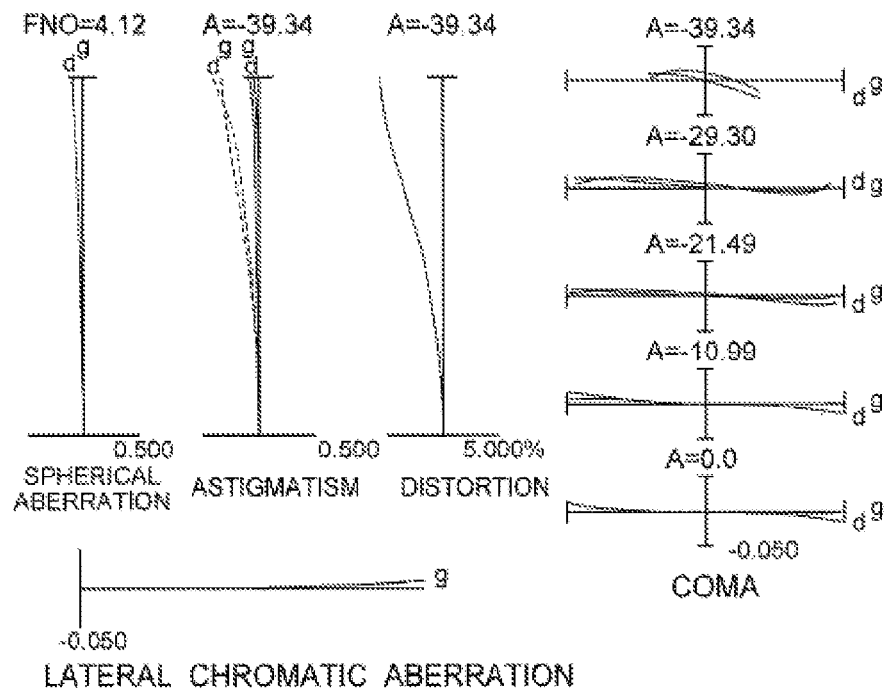
FIGS. 5A and 5B are graphs showing various aberrations in the wide-angle end state and in the first intermediate focal length state, of the zooming optical system according to the second Example upon focusing on infinity.
Figure 5B:
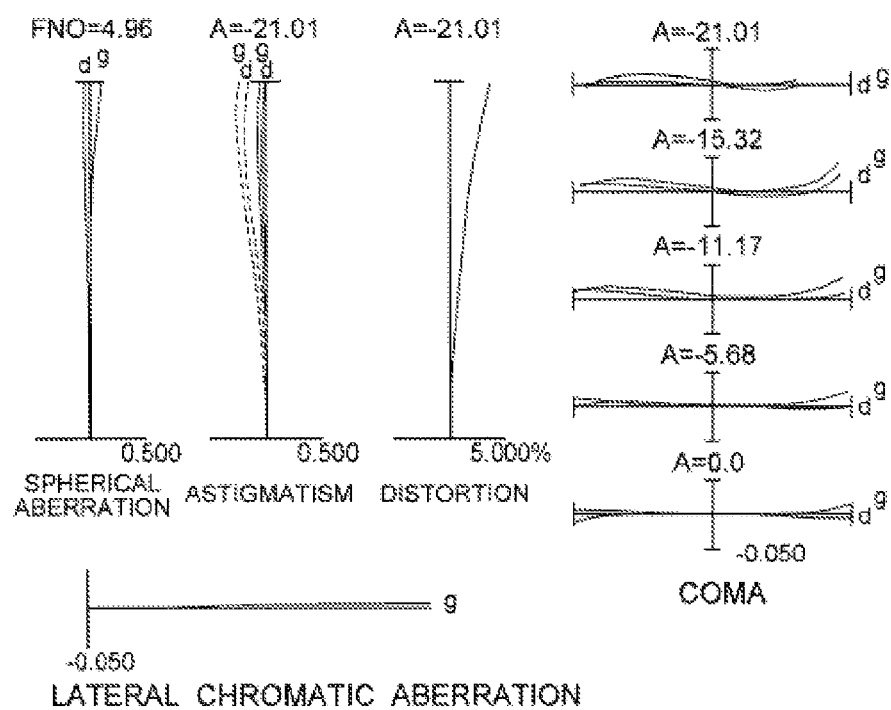

FIGS. 5A and 5B, respectively, are graphs showing various aberrations in the wide-angle end state and in the first intermediate focal length state, of the zooming optical system according to the second Example of the present application upon focusing on infinity.

Figure 6A:
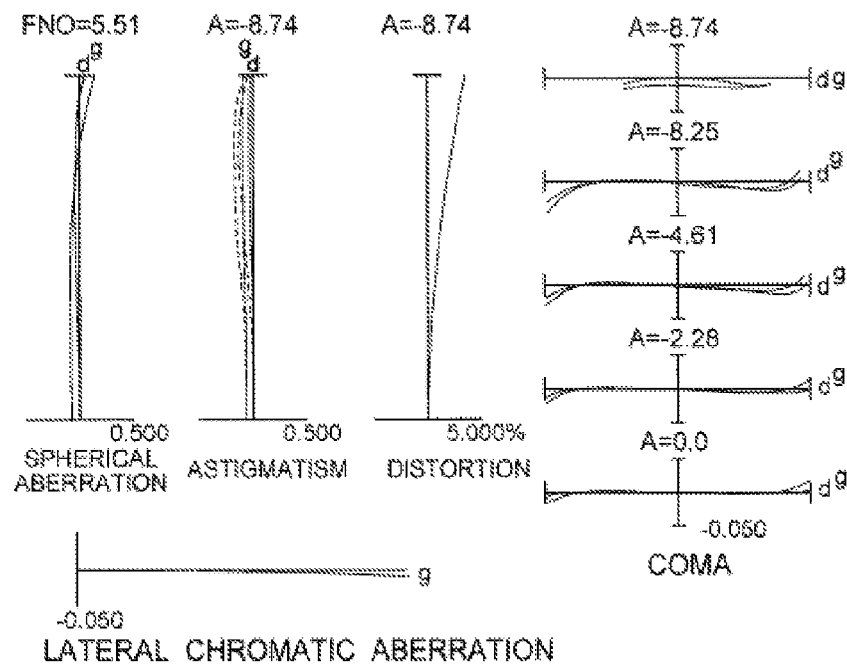
FIGS. 6A and 6B are graphs showing various aberrations in the second intermediate focal length state and in the telephoto end state, of the zooming optical system according to the second Example upon focusing on infinity.
Figure 6B:
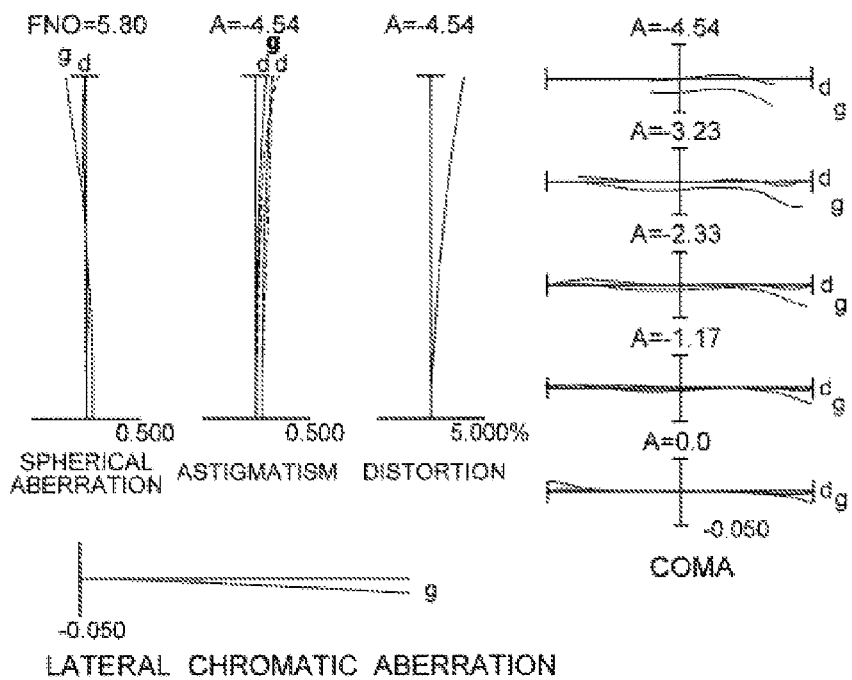

FIGS. 6A and 6B, respectively, are graphs showing various aberrations in the second intermediate focal length state and in the telephoto end state, of the zooming optical system according to the second Example of the present application upon focusing on infinity.

As is apparent from the respective graphs, the zooming optical system according to the present Example shows superb optical performance as a result of good corrections to various aberrations in the range from the wide-angle end state to the telephoto end state.

Third Example

Figure 7:
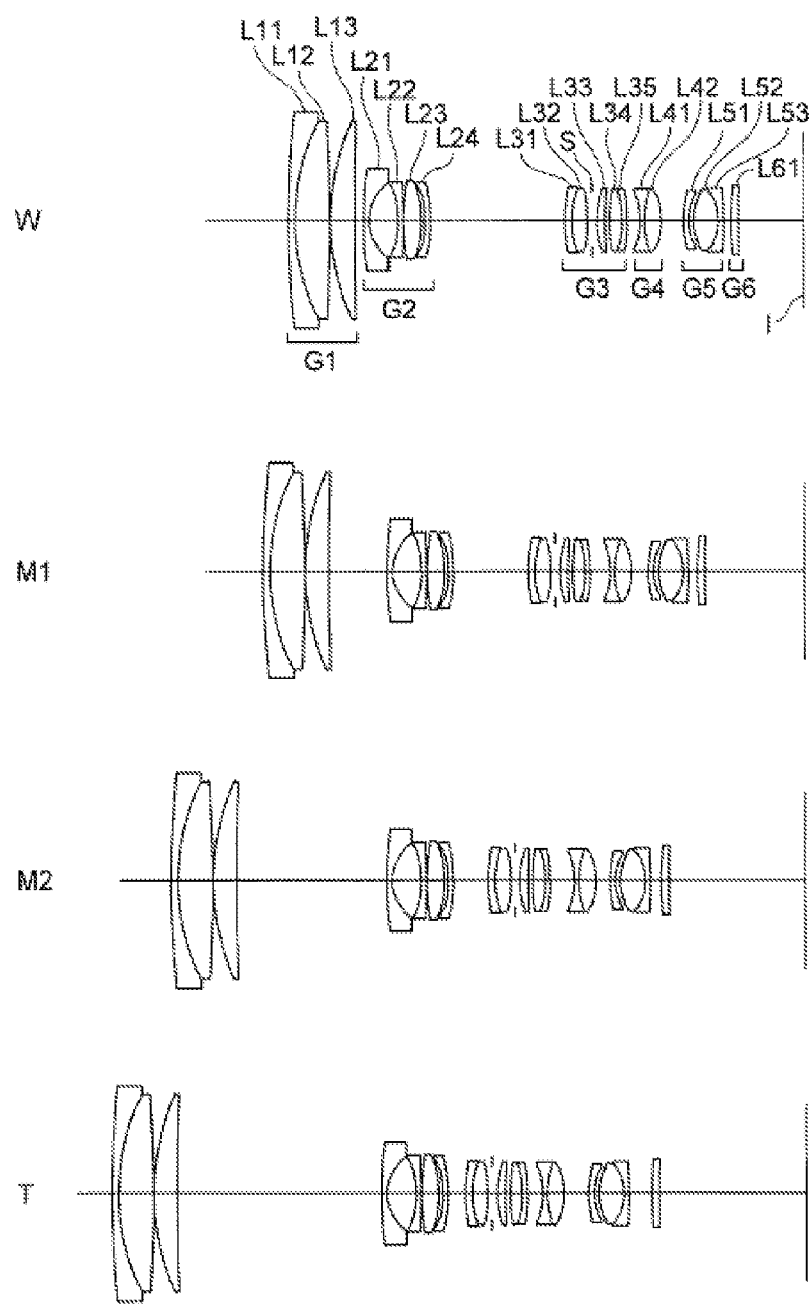
FIG. 7 shows sectional views in a wide-angle end state, in a first intermediate focal length state, in a second intermediate focal length state and in a telephoto end state, of a zooming optical system according to a third Example of the present application.

FIG. 7 shows sectional views in a wide-angle end state, in a first intermediate focal length state, in a second intermediate focal length state and in a telephoto end state, of a zooming optical system according to a third Example of the present application.

The zooming optical system according to the present Example is composed of, in order from an object side along the optical axis, a first lens group G1 having positive refractive power, a second lens group G2 having negative refractive power, a third lens group G3 having positive refractive power, a fourth lens group G4 having negative refractive power, a fifth lens group G5 having negative refractive power, and a sixth lens group G6 having positive refractive power.

The first lens group G1 is composed of, in order from an object side along the optical axis, a cemented lens composed of a negative meniscus lens L11 having a convex surface facing the object side and a biconvex positive lens L12 cemented together, and a positive meniscus lens L13 having a convex surface facing the object side.

The second lens group G2 is composed of, in order from an object side along the optical axis, a negative meniscus lens L21 having a convex surface facing the object side, a negative meniscus lens L22 having a concave surface facing the object side, a biconvex positive lens L23, and a negative meniscus lens L24 having a concave surface facing the object side. The negative meniscus lens L21 is a glass mold type aspherical lens whose aspherical surface is applied on the image plane side lens surface.

The third lens group G3 is composed of, in order from an object side along the optical axis, a cemented lens composed of a negative meniscus lens L31 having a convex surface facing the object side and a biconvex positive lens L32 cemented together, a positive meniscus lens L33 having a convex surface facing the object side, and a cemented lens composed of a biconvex positive lens L34 and a negative meniscus lens L35 having a concave surface facing the object side. An aperture stop S is provided between the positive lens L32 and the positive lens L33 in the third lens group G3.

The fourth lens group G4 is composed of, in order from an object side along the optical axis, only a cemented lens composed of a biconcave negative lens L41 and a biconvex positive lens L42 cemented together. The most object side negative lens L41 in the fourth lens group G4 is a glass mold type aspherical lens whose aspherical surface is applied on the object side lens surface.

The fifth lens group G5 is composed of, in order from an object side along the optical axis, a negative meniscus lens L51 having a convex surface facing the object side, and a cemented lens composed of a biconvex positive lens L52 and a negative meniscus lens L53 having a concave surface facing the object side and cemented together. A lens surface which is concave facing the object side and whose radius of curvature is smallest in absolute value, in the fifth lens group G5, is the cemented surface between the positive lens L52 and the negative meniscus lens L53. The positive lens L51 at the most object side in the fifth lens group G5 is a glass mold type aspherical lens whose aspherical surface is applied on the object side lens surface.

The sixth lens group G6 is composed of only a positive meniscus lens L61 having a convex surface facing the object side.

In the zooming optical system according to the present Example having configured as above described, upon zooming from the wide angle end state W to the telephoto end state T, the first lens group G1 moves monotonously toward the object side; the second lens group G2 moves toward the image side from the wide angle end state W to the first intermediate focal length state M1 and then moves toward the object side from the first intermediate focal length state M1 to the telephoto end state T; and the third lens group G3, the fourth lens group G4, the fifth lens group G5 and the sixth lens group G6 move monotonously toward the object side. At this time, the aperture stop S, the third lens group G3 and the fifth lens group G5 move together in a body. Thus, upon zooming from the wide angle end state W to the telephoto end state T, a distance between the first lens group G1 and the second lens group G2 increases, a distance between the second lens group G2 and the third lens group G3 decreases, a distance between the third lens group G3 and the fourth lens group G4 increases from the wide angle state W to the second intermediate focal length state M2 and decreases from the second intermediate focal length state M2 to the telephoto end state T, a distance between the fourth lens group G4 and the fifth lens group G5 decreases from the wide angle end state W to the second intermediate focal length state M2 and increases from the second intermediate focal length state M2 to the telephoto end state T, and a distance between the fifth lens group G5 and the sixth lens group G6 increases.

Various values associated with the zooming optical system according to the third Example are listed in Table 3.

TABLE 3

Third Example

[Surface Data]

| m | r | d | nd | νd |
|---|---|---|---|---|
| op | ∞ | | | |
| 1 | 154.5301 | 1.4000 | 1.950000 | 29.37 |
| 2 | 39.8607 | 7.2500 | 1.497820 | 82.57 |
| 3 | −283.4227 | 0.1000 | | |
| 4 | 43.5964 | 4.8500 | 1.883000 | 40.66 |
| 5 | 446.9311 | d5 | | |
| 6 | 96.1250 | 1.0000 | 1.806100 | 40.97 |
| *7 | 8.1961 | 6.1500 | | |
| 8 | −14.4871 | 1.0000 | 1.883000 | 40.66 |
| 9 | −97.9643 | 0.1000 | | |
| 10 | 44.3150 | 3.6500 | 1.808090 | 22.74 |
| 11 | −17.2518 | 0.8000 | | |
| 12 | −14.4809 | 1.0000 | 1.883000 | 40.66 |
| 13 | −24.0963 | d13 | | |
| 14 | 30.1004 | 1.4000 | 1.950000 | 29.37 |
| 15 | 18.1656 | 2.8500 | 1.497820 | 82.57 |
| 16 | −30.1820 | 1.0000 | | |
| 17 | ∞ | 1.0000 | | Aperture Stop S |
| 18 | 21.4294 | 1.5000 | 1.806100 | 40.97 |
| 19 | 61.8962 | 1.0500 | | |
| 20 | 32.7220 | 2.5500 | 1.497820 | 82.57 |
| 21 | −17.3215 | 1.0000 | 2.000690 | 25.46 |
| 22 | −26.1872 | d22 | | |
| *23 | −11.1837 | 1.0000 | 1.806100 | 40.73 |
| 24 | 20.9851 | 3.4000 | 1.647690 | 33.72 |
| 25 | −11.9280 | d25 | | |
| *26 | 31.4353 | 1.0000 | 1.806100 | 40.73 |
| 27 | 10.4731 | 1.0000 | | |
| 28 | 10.6935 | 5.2000 | 1.575010 | 41.51 |
| 29 | −8.0000 | 1.0000 | 1.950000 | 29.37 |
| 30 | −43.9250 | d30 | | |
| 31 | 76.8127 | 1.4000 | 1.808090 | 22.74 |
| 32 | 130.1997 | Bf | | |
| I | ∞ | | | |

[Aspherical Data]

Surface Number: 7

| κ | 1.0193 |
| A4 | −7.25972E−05 |
| A6 | −2.01927E−06 |
| A8 | 5.23101E−08 |
| A10 | −1.09165E−09 |

Surface Number: 23

| κ | −3.3364 |
| A4 | −2.63114E−04 |
| A6 | 2.76766E−06 |
| A8 | −3.39467E−08 |
| A10 | 6.49727E−11 |

Surface Number: 26

| κ | 1.5816 |
| A4 | −1.528272E−05 |
| A6 | 7.21136E−07 |
| A8 | −2.56336E−09 |
| A10 | 4.03092E−10 |

[Various Data]
Zoom ratio 9.42

| | W | T |
|---|---|---|
| f | 10.30~97.00 | |
| FNO | 3.63~5.80 | |
| ω | 39.36~4.56° | |

TABLE 3-continued

Third Example

| Y | 7.97~7.97 |
| TL | 104.89~139.98 |

|  | W | M1 | M2 | T |
| --- | --- | --- | --- | --- |
| f | 10.30000 | 20.00000 | 50.00000 | 97.00000 |
| ω | 39.35588 | 21.00824 | 8.74248 | 4.55748 |
| FNO | 3.63391 | 4.50179 | 5.47868 | 5.80104 |
| φ | 10.60 | 10.60 | 10.60 | 10.60 |
| d5 | 2.00000 | 12.01131 | 29.94199 | 40.54244 |
| d13 | 26.77743 | 14.69932 | 6.72364 | 3.40000 |
| d22 | 2.66702 | 3.74847 | 4.51403 | 2.66188 |
| d25 | 4.74793 | 3.66651 | 2.90094 | 4.75306 |
| d30 | 1.50000 | 1.80000 | 2.40000 | 4.50000 |
| Bf | 13.54939 | 20.44615 | 27.99896 | 30.47600 |

[Lens Group Data]

|  | ST | f |
| --- | --- | --- |
| G1 | 1 | 64.96294 |
| G2 | 6 | −10.79650 |
| G3 | 14 | 15.45800 |
| G4 | 23 | −68.94014 |
| G5 | 26 | −50.62258 |
| G6 | 31 | 244.13912 |

[Values for Conditional Expressions]

(1) (−f5)/fw = 4.915
(2) f5/f4 = 0.734
(3) (−f5)/f3 = 3.275
(4) R5/f5 = 0.158

Figure 8A:
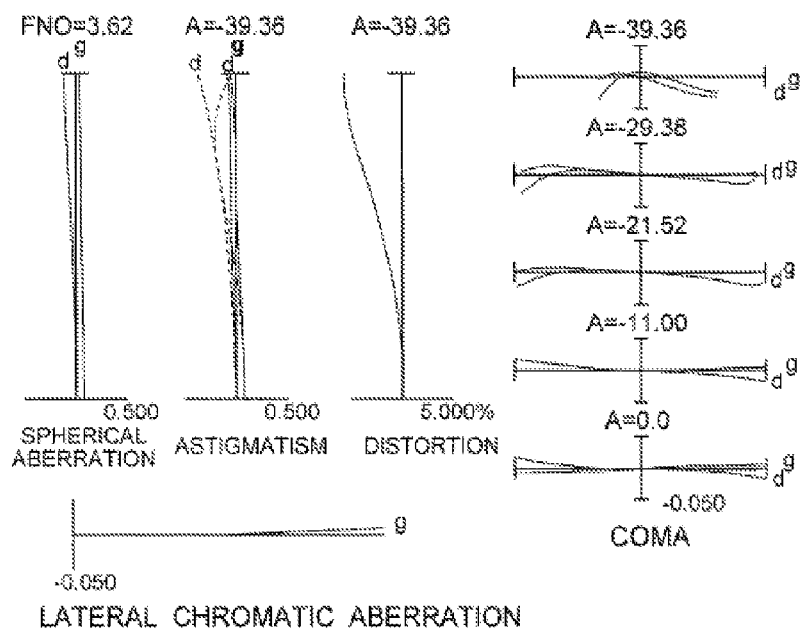
FIGS. 8A and 8B are graphs showing various aberrations in the wide-angle end state and in the first intermediate focal length state, of the zooming optical system according to the third Example upon focusing on infinity.
Figure 8B:
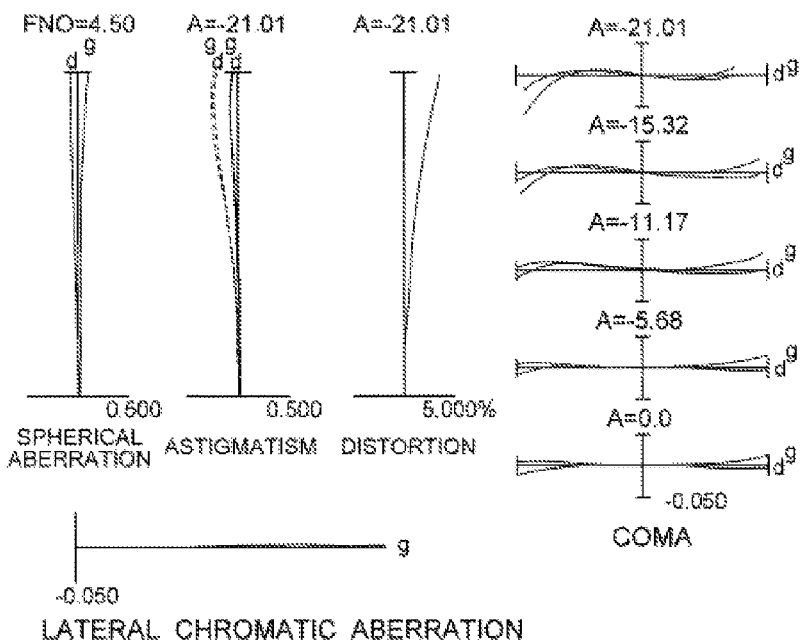

FIGS. 8A and 8B, respectively, are graphs showing various aberrations in the wide-angle end state and in the first intermediate focal length state, of the zooming optical system according to the third Example upon focusing on infinity.

Figure 9A:
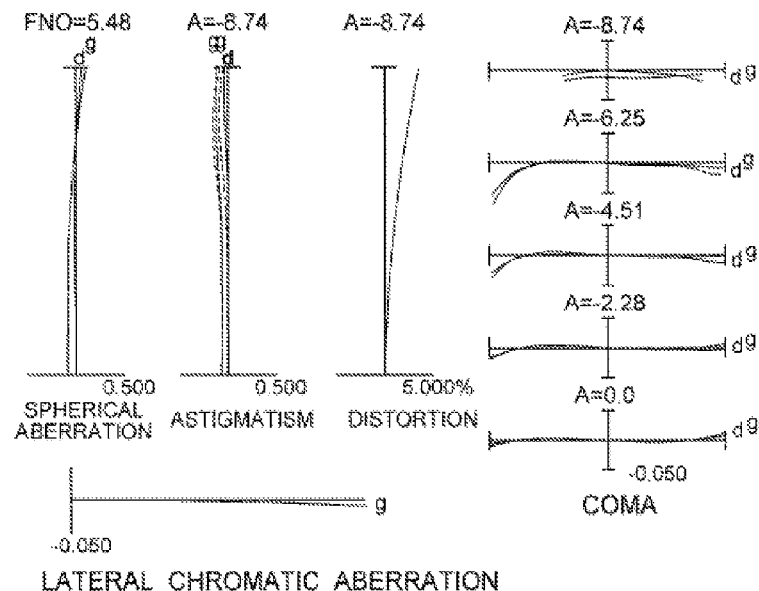
FIGS. 9A and 9B are graphs showing various aberrations in the second intermediate focal length state and in the telephoto end state, of the zooming optical system according to the third Example upon focusing on infinity.
Figure 9B:
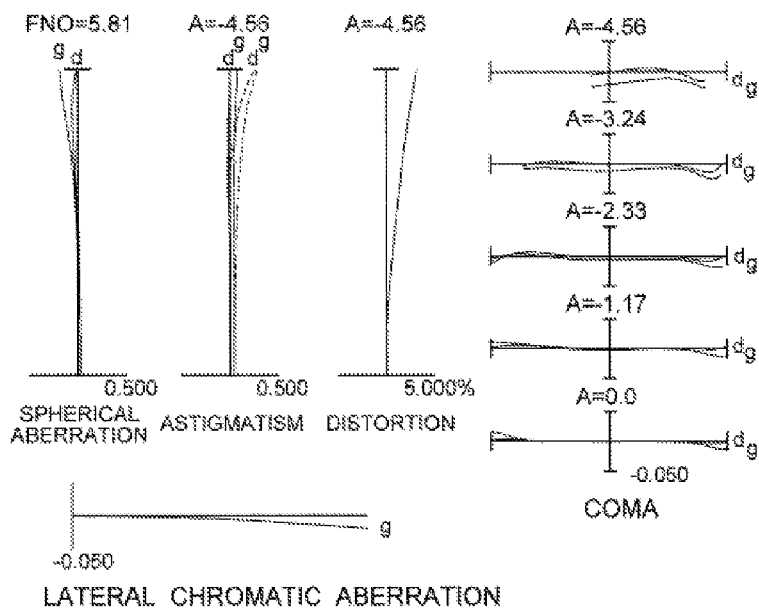

FIGS. 9A and 9B, respectively, are graphs showing various aberrations in the second intermediate focal length state and in the telephoto end state, of the zooming optical system according to the third Example upon focusing on infinity.

As is apparent from the respective graphs, the zooming optical system according to the present Example shows superb optical performance as a result of good corrections to various aberrations in the range from the wide-angle end state to the telephoto end state.

According to each Example described above, it is possible to realize a compact zooming optical system having high zooming ratio and superb optical performance. The Examples described above only shows a specific example of the present invention. Accordingly, the invention is not limited to those Examples.

The followings may be adopted properly without deteriorating optical performance of the zooming optical system of the present application.

As numerical Examples of the zooming optical system of the present application, optical systems having five group configuration or six group configuration were shown above, but the present application is not limited to them but optical system having other configuration such as seven group configuration is possible. In more concrete, it is possible to add a lens or a lens group to the most object side or to the most image side of the zooming optical system of the present application. Incidentally, the term "lens group" is intended to mean a portion having at least a lens separated by air space changing upon zooming.

In the zooming optical system of the present application, a portion of a lens group, the whole of a single lens group or a plurality of lens groups may be configured to be movable in the direction of the optical axis as a focusing lens group in order to focus on from an infinitely distant object to a closely distant object. In particular, it is preferable that at least a portion of the fourth lens group is adopted as the focusing lens group. Such a focusing lens group may be applied for autofocusing, and is suitable to be driven by autofocusing motor such as ultrasonic motor.

In the zooming optical system according to the present application, a lens group or a portion of a lens group may be shifted in a direction including a component perpendicular to the optical axis as a vibration reduction lens group, or tilted (fluctuated) in a direction including the optical axis for correcting an image blur caused by a camera shake. In the zooming optical system according to the present application, it is particularly preferable that at least a portion of the third lens group is used as the vibration reduction lens group.

A lens surface of a lens composing the zooming optical system according to the present application may be a spherical surface, a plane surface, or an aspherical surface. When a lens surface is a spherical surface or a plane surface, lens processing, assembling and adjustment become easy, and deterioration in optical performance caused by lens processing, assembling and adjustment errors can be prevented, so that it is preferable. Moreover, even if the surface is shifted, deterioration in optical performance is little, so that it is preferable. When a lens surface is an aspherical surface, the aspherical surface may be fabricated by a fine grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

In the zooming optical system according to the present application, an aperture stop is preferably provided between the second lens group and the third lens group, or inside of the third lens group, and the function may be substituted by a lens frame without disposing a member as an aperture stop.

An antireflection coating having high transmittance over a broad wavelength range may be applied to each lens surface of the zooming optical system according to the present application to reduce flare or ghost images, so that high optical performance with high contrast can be attained.

In the zooming optical system according to the present application, a zooming ratio is about 3 to 20.

A camera equipped with a zooming optical system according to the present application is explained with reference to FIG. 10.

Figure 10:
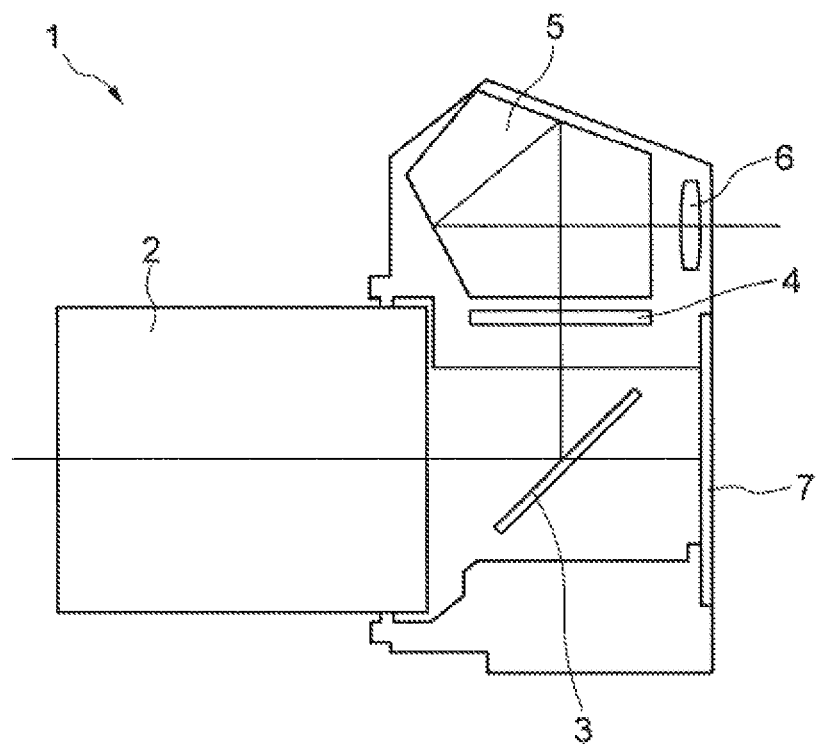
FIG. 10 is a view showing a configuration of a camera equipped with the zooming optical system according to the present application.

FIG. 10 is a diagram showing a construction of a camera equipped with the zooming optical system according to the present application.

The present camera 1 is a single lens reflex digital camera equipped with the zooming optical system according to the first Example as an imaging lens 2.

In the present camera 1, light coming out from an object (not shown) to be photographed is converged by the imaging lens 2, reflected by a quick return mirror 3, and focused on a focusing screen 4. The light focused on the focusing screen 4 is reflected a plurality of times by a pentagonal roof prism 5, and led to an eyepiece 6. Accordingly, a photographer can observe the object image as an erected image through the eyepiece 6.

When the photographer presses a release button (not shown), the quick return mirror 3 is retracted out of the optical path, the light from the object (not shown) is detected by an imaging device 7, and a photographed image is captured and stored in a memory (not shown). In this manner, the photographer can take an image of an object by the camera 1.

It is noted here that the zooming optical system according to the first Example mounted on the present camera 1 as the imaging lens 2 is compact and has a high zooming ratio and excellent optical performance. Accordingly, the present camera 1 may be made compact and may realize superb optical performance while attaining high zooming ratio. A camera equipped with the zooming optical system according to the second or third Examples described above can perform the same effect as the camera 1. Even a case where a camera having no quick return mirror 3, is equipped with the zooming optical system according to each Example described above, the same effect as the above described camera 1 can be attained.

Finally, an outline of a method for manufacturing a zooming optical system according to the present application is explained with reference to FIG. 11.

Figure 11:
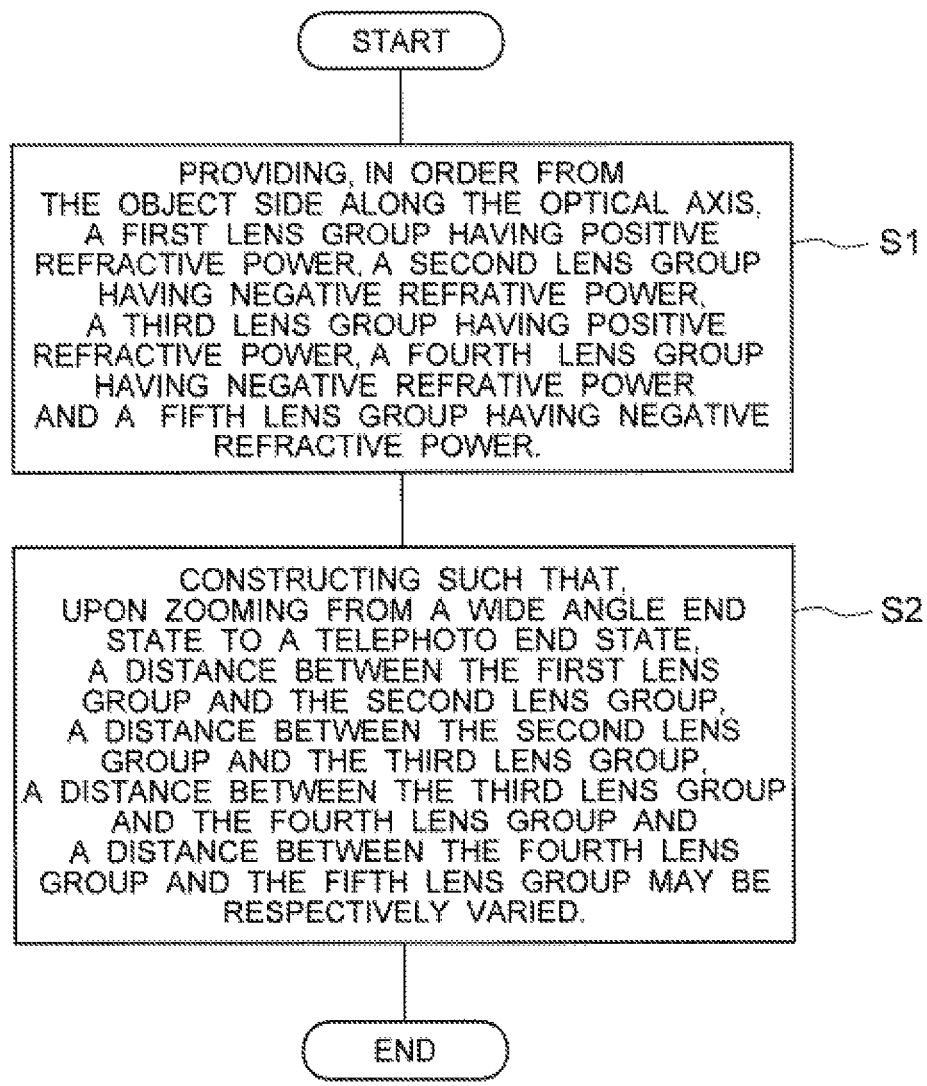
FIG. 11 is a flowchart schematically showing a method for manufacturing the zooming optical system according to the present application.

A method for manufacturing the zooming optical system according to the present application, shown in FIG. 11, includes the following steps S1 and S2:

Step S1: providing, in order from the object side along the optical axis, a first lens group having positive refractive power, a second lens group having negative refractive power, a third lens group having positive refractive power, a fourth lens group having negative refractive power and a fifth lens group having negative refractive power.

Step S2: providing a publicly known moving mechanism such that, upon zooming from a wide angle end state to a telephoto end state, a distance between said first lens group and said second lens group, a distance between said second lens group and said third lens group, a distance between said third lens group and said fourth lens group and a distance between said fourth lens group and said fifth lens group may be respectively varied.

With the method for manufacturing the zoom lens system according to the present application, it becomes possible to manufacture a compact zooming optical system having a high zoom ratio and excellent optical performance.

What is claimed is:

1. A zooming optical system comprising, in order from an object side along an optical axis:
    a first lens group having positive refractive power,
    a second lens group having negative refractive power,
    a third lens group having positive refractive power, and
    a fourth lens group having negative refractive power, and
    a fifth lens group having negative refractive power, and
    wherein upon zooming from a wide angle end state to a telephoto end state a distance between said first lens group and said second lens group, a distance between said second lens group and said third lens group, a distance between said third lens group and said fourth lens group, and a distance between said fourth lens group and said fifth lens group are respectively varied,
    wherein the following conditional expression is satisfied:

$$3.532 \leq (-f5)/fw \leq 7.479$$

where f5 denotes a focal length of the fifth lens group and fw denotes a focal length of the zooming optical system in the wide angle end state.

2. The zooming optical system according to claim 1, wherein the following conditional expression is satisfied:

$$0.40 < f5/f4 < 4.20$$

where f4 denotes a focal length of the fourth lens group.

3. The zooming optical system according to claim 1, wherein the following conditional expression is satisfied:

$$0.88 < (-f5)/f3 < 8.20$$

where f3 denotes a focal length of the third lens group.

4. The zooming optical system according to claim 1, wherein the following conditional expression is satisfied:

$$0.066 < R5/f5 < 0.600$$

where R5 denotes curvature radius of a lens surface in the fifth lens group which is concave facing the object side and whose curvature radius is smallest in absolute value.

5. The zooming optical system according to claim 1, wherein the following conditional expression is satisfied:

$$0.066 < R5/f5 < 0.600$$

where R5 denotes curvature radius of a lens surface in said fifth lens group which is concave facing the object side and whose curvature radius is smallest in absolute value; and
    wherein said fifth lens group has a cemented lens, and said lens surface in said fifth lens group which is concave facing the object side and whose curvature radius is smallest in absolute value, is a cemented surface between two lens elements of the cemented lens.

6. The zooming optical system according to claim 1, wherein, upon zooming from the wide angle end state to the telephoto end state, a distance between the third lens group and the fourth lens group increases from the wide angle end state to an intermediate focal length state and decreases from the intermediate focal length state to the telephoto end state.

7. The zooming optical system according to claim 1, wherein, upon zooming from the wide angle end state to the telephoto end state, a distance between the fourth lens group and the fifth lens group decreases from the wide angle end state to an intermediate focal length state and increases from the intermediate focal length state to the telephoto end state.

8. The zooming optical system according to claim 1, wherein, upon zooming from the wide angle end state to the telephoto end state, the third lens group and the fifth lens group are moved in a body.

9. The zooming optical system according to claim 1, wherein, upon zooming from the wide angle end state to the telephoto end state, a distance between the first lens group and the second lens group increases and a distance between the second lens group and the third lens group decreases.

10. The zooming optical system according to claim 1, wherein said fifth lens group has an aspherical surface.

11. The zooming optical system according to claim 1, wherein said fifth lens group has an aspherical surface, and said aspherical surface is the most object side surface in said fifth lens group.

12. The zooming optical system according to claim 1, wherein an aperture stop is provided inside of or adjacent to said third lens group.

13. The zooming optical system according to claim 1, wherein an aperture stop is provided inside of or adjacent to said third lens group, and
    upon zooming from the wide angle end state to the telephoto end state said aperture stop is moved together with said third lens group in a body.

14. An optical apparatus equipped with the zooming optical system according to claim 1.

15. A method for manufacturing a zooming optical system comprising steps of
    disposing, in order from an object side along an optical axis, a first lens group having positive refractive power, a second lens group having negative refractive power, a third lens group having positive refractive power, a fourth lens group having negative refractive power, and a fifth lens group having negative refractive power, such that, upon zooming from a wide angle end state to a telephoto end state, a distance between said first lens group and said second lens group, a distance between said second lens group and said third lens group, a distance between said third lens group and said fourth lens group and a distance between said fourth lens group and said fifth lens group are respectively varied; and satisfying the following conditional expression:

$$3.532 \leq (-f5)/fw \leq 7.479$$

where f5 denotes a focal length of the fifth lens group and fw denotes a focal length of the zooming optical system in the wide angle end state.

\* \* \* \* \*